(12) United States Patent
Niles

(10) Patent No.: US 9,552,830 B2
(45) Date of Patent: Jan. 24, 2017

(54) VEHICLE LANGUAGE SETTING SYSTEM

(71) Applicant: James E. Niles, New York, NY (US)

(72) Inventor: James E. Niles, New York, NY (US)

( * ) Notice: Subject to any disclaimer, the term of this patent is extended or adjusted under 35 U.S.C. 154(b) by 4 days.

(21) Appl. No.: 14/516,750

(22) Filed: Oct. 17, 2014

(65) Prior Publication Data

US 2016/0107577 A1    Apr. 21, 2016

(51) Int. Cl.
| | | |
|---|---|---|
| *G10L 21/00* | (2013.01) | |
| *G10L 25/48* | (2013.01) | |
| *G06F 9/44* | (2006.01) | |
| *H04M 1/725* | (2006.01) | |
| *B60R 1/00* | (2006.01) | |
| *G06F 17/27* | (2006.01) | |
| *G06F 17/28* | (2006.01) | |

(52) U.S. Cl.
CPC .............. *G10L 25/48* (2013.01); *B60R 1/001* (2013.01); *G06F 9/4448* (2013.01); *G06F 17/275* (2013.01); *G06F 17/289* (2013.01); *H04M 1/7253* (2013.01); *H04M 1/72552* (2013.01); *B60K 2350/10* (2013.01); *B60R 2300/205* (2013.01)

(58) Field of Classification Search
CPC ....... G10L 15/265; G10L 25/48; G06F 17/289
USPC ..................................... 704/270, 8
See application file for complete search history.

(56) References Cited

U.S. PATENT DOCUMENTS

| | | | | |
|---|---|---|---|---|
| 6,081,803 A | * | 6/2000 | Ashby | G01C 21/32 |
| 6,553,308 B1 | * | 4/2003 | Uhlmann | B61L 29/24 |
| | | | | 340/988 |
| 6,618,650 B1 | * | 9/2003 | Nakai | G07F 17/0042 |
| | | | | 701/1 |
| 7,349,722 B2 | * | 3/2008 | Witkowski | G07C 5/008 |
| | | | | 455/41.2 |
| 7,480,546 B2 | | 1/2009 | Kamdar et al. | |
| 8,897,423 B2 | | 11/2014 | Nanjundaswamy | |
| 9,211,811 B2 | * | 12/2015 | Breed | B60C 11/24 |
| 2001/0037203 A1 | * | 11/2001 | Satoh | G01C 21/36 |
| | | | | 704/270 |
| 2002/0069002 A1 | * | 6/2002 | Morehouse | B60R 16/037 |
| | | | | 701/29.6 |
| 2003/0186662 A1 | * | 10/2003 | Himmel | B60R 25/2081 |
| | | | | 455/185.1 |
| 2003/0202683 A1 | | 10/2003 | Ma et al. | |

(Continued)

FOREIGN PATENT DOCUMENTS

| | | |
|---|---|---|
| EP | 1359557 | 11/2003 |
| EP | 2 597 838 A1 | 5/2013 |

(Continued)

*Primary Examiner* — Shaun Roberts

(57) ABSTRACT

A language setting system, for use by a driver having a preferred language and a smartphone, when entering a vehicle to set an active language of the vehicle for vehicle communications with the driver. The vehicle connects with and scans the smartphone. When the smartphone has a user selected language setting, the user selected language setting is used to set the active language of the vehicle. When scan of the smartphone detects examples of language usage in text and email communications, and such examples meet a threshold usage, the active language may be set to the language of the usage examples. When examples of multiple languages are detected on the smartphone, the driver may be prompted to select the preferred language from a list of the detected examples.

14 Claims, 6 Drawing Sheets

(56) References Cited

U.S. PATENT DOCUMENTS

| | | | |
|---|---|---|---|
| 2005/0086051 A1* | 4/2005 | Brulle-Drews | G01C 21/3602 704/7 |
| 2008/0070604 A1* | 3/2008 | Castagnet | G06F 3/0237 455/466 |
| 2008/0319652 A1* | 12/2008 | Moshfeghi | G01C 21/3667 701/532 |
| 2009/0204410 A1* | 8/2009 | Mozer | G10L 15/30 704/275 |
| 2009/0285445 A1 | 11/2009 | Vasa | |
| 2011/0105098 A1* | 5/2011 | Tengler | G07C 5/008 455/418 |
| 2011/0218812 A1* | 9/2011 | Patel | G06Q 30/04 704/277 |
| 2012/0028680 A1 | 2/2012 | Breed | |
| 2012/0068858 A1* | 3/2012 | Fredkin | G08G 1/096741 340/902 |
| 2012/0194356 A1* | 8/2012 | Haines | G08G 1/161 340/933 |
| 2014/0187149 A1* | 7/2014 | Lortz | H04W 4/008 455/41.1 |
| 2014/0214933 A1* | 7/2014 | Liu | H04L 67/02 709/204 |

FOREIGN PATENT DOCUMENTS

| | | |
|---|---|---|
| WO | WO2009139783 | 11/2009 |
| WO | WO 2014/107793 A1 | 7/2014 |

* cited by examiner

VEHICLE LANGUAGE SETTING SYSTEM

TECHNICAL FIELD

The present disclosure relates generally to vehicle systems that communicate and interact with their drivers using multiple languages. More particularly, the present disclosure relates to a system for automatically setting the active language of a vehicle to a preferred language of the driver by referencing the smartphone of the driver.

BACKGROUND

Providing a seamless user experience is no longer just a goal of some companies, it is now fully expected by consumers. The experience they expect includes seamless integration of not just their devices, but also their platforms of choice—including their telephone communications, their email, and their social media platforms.

Along with this expectation, is the assumption that their devices will speak their language. And this is not metaphorical, consumers expect them to actually speak their native language. Not long ago, many users suffered through the use of devices that only spoke one language—typically English. These days, however, all devices support multiple languages, and some devices are even capable of fully interacting with their users in more than one hundred languages.

While the automobile industry is typically a latecomer to the so-called systems integration party, consumers are developing a healthy level of expectation for them as well. When purchasing a new vehicle, they now expect it to integrate their smartphone—including handsfree communication and music streaming using BLUETOOTH. They expect it to have provisions for uploading and storing their music library in the vehicle infotainment system. And yes—they now expect it to speak their native language too.

Setting the language on any device can be tricky, because the user must first navigate a command menu in another language just to find the language setting. This is especially the case if the device is not being set up for the first time.

As vehicles are often driven by more than one person, it is quite likely that the person about to drive it is not setting it up for the first time. Accordingly, while many people often abandon their attempts to set a language on a device for the foregoing reasons, it can be downright dangerous if the person drives a vehicle which attempts to notify him or her with important messages and information, but does so in a language the driver does not understand. Thus, not only for the sake of seamless integration, but also for safety, there exists a need for a system that easily sets the vehicle language to a language readily understood by the driver.

Considering that millions of people each year rent automobiles in countries where languages other than their own are spoken more commonly, it is a frequent occurrence that drivers are unable to understand vehicle prompts, messages, and street signs sufficiently to act appropriately and safely. Accordingly, this language mismatch between drivers and vehicles creates a huge safety concern.

There have been attempts by some to provide solutions for setting languages of various devices. While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a language setting system that automatically sets the active language for a vehicle to a preferred language of the driver. Accordingly, the present disclosure provides a system that communicates with a portable electronic device of a driver to determine the preferred language of the driver and then appropriately set the active language of the vehicle.

It is another aspect of an example embodiment in the present disclosure to provide a system the reliably determines the preferred language from the electronic device. Accordingly, the portable electronic device may be a smartphone, that is scanned to determine the user selected language setting of the device, and to empirically detect examples of language usage on the device by the driver, such as by scanning emails and text messages.

It is yet another aspect of an example embodiment in the present disclosure to provide a system that makes external information readily discernible by the driver. Accordingly, after the active language has been set to the preferred language of the driver, the system may translate external information, including road signs, vehicle to vehicle communications, and infrastructure to vehicle communications, into the preferred language of the driver.

Accordingly, the present disclosure describes a language setting system, for use by a driver having a preferred language and a smartphone, when entering a vehicle to set an active language of the vehicle for vehicle communications with the driver. The vehicle connects with and scans the smartphone. When the smartphone has a user selected language setting, the user selected language setting is used to set the active language of the vehicle. When the scan of the smartphone detects examples of language usage in text and email communications, and such examples meet a threshold of usage, the active language may be set to the language of the usage examples. When examples of multiple languages are detected on the smartphone, the driver may be prompted to select the preferred language from a list of the detected examples.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
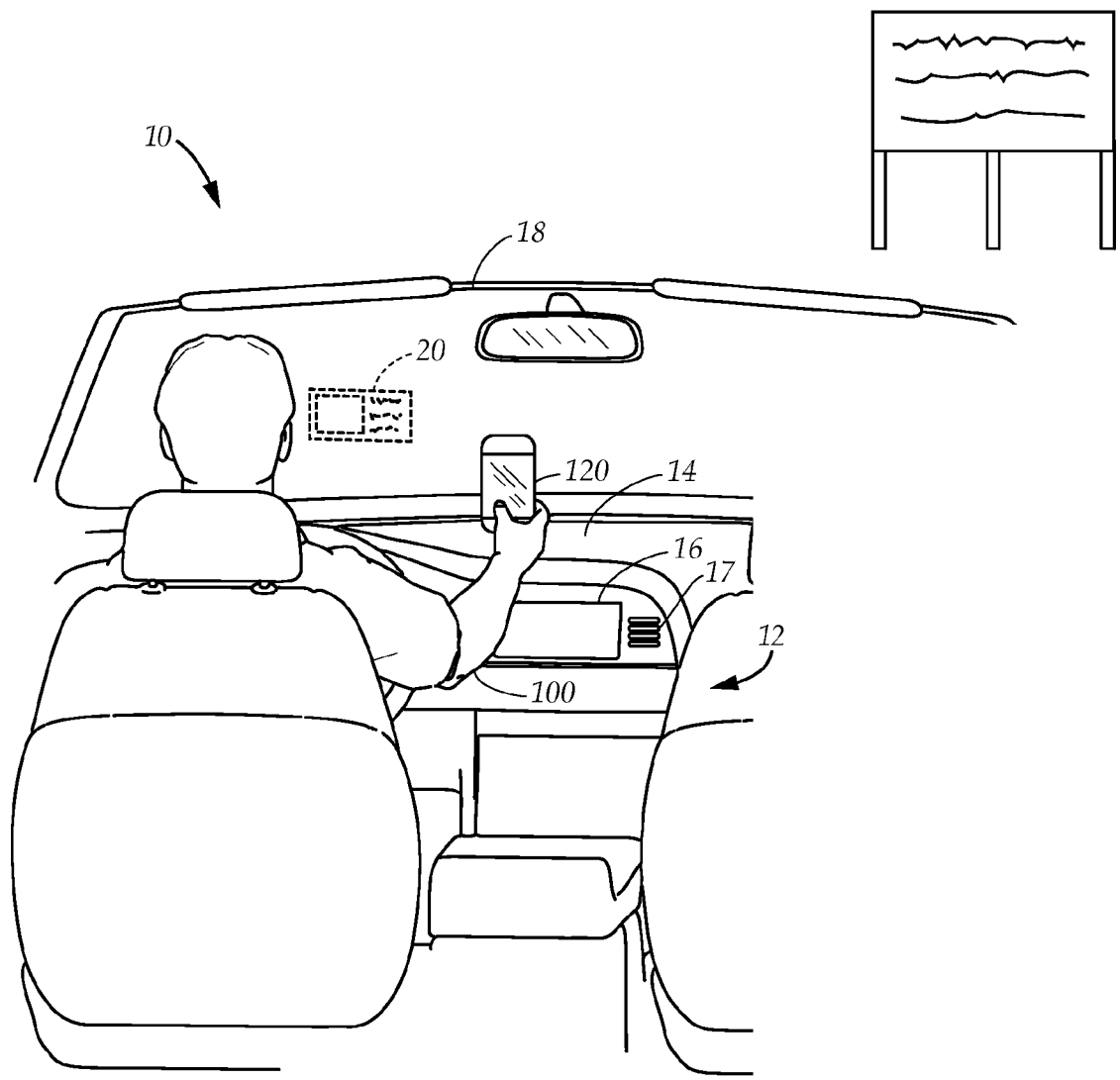
FIG. 1 is a diagrammatic perspective view, depicting an example embodiment of a language setting system within a vehicle, in accordance with the present disclosure

FIG. 1 illustrates a vehicle 10 having a passenger compartment 12. The passenger compartment has a dashboard 14, having a dashboard display 16 and an audio module 17. The vehicle 10 also has a windshield 18 having a heads up display 20. A driver 100 is seated in the vehicle 10, and has a portable electronic device 120 such as a smartphone. The portable electronic device 120 is a device carried by the driver for personal communications, including text and email communications, and generally has a user selected language setting. The driver 100 has a preferred language, which may be his/her native language, or one which he/she prefers and is most comfortable using. Note that the term "driver" as used herein is not intended to be narrowly interpreted. "Driver" may be interpreted as the person primarily operating the vehicle, directing the vehicle's operation, or at who's behest the vehicle operates, and accordingly would apply equally to a person traveling in a partially or fully automated, self-driven vehicle.

Figure 2:
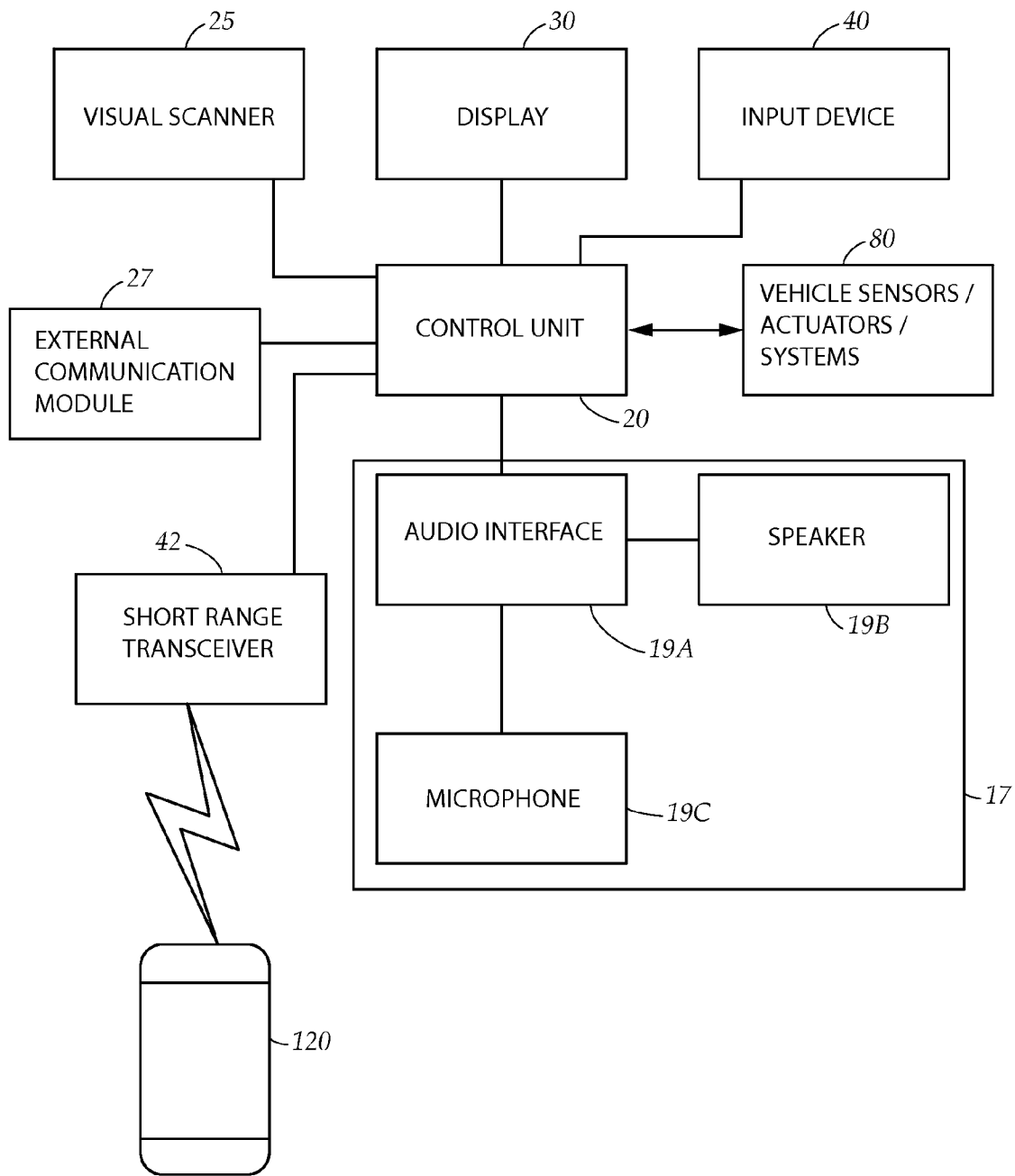
FIG. 2 is a functional block diagram, showing interconnection of components of the language setting system.

FIG. 2 illustrates functional interconnection of components of the vehicle 10, including a control unit 20. The control unit manages the functionality of the language setting system described herein, and may also control the functionality of other vehicle systems, and/or may be in communication with other control units which operate such other vehicle systems. Accordingly, the control unit 20 is configured to interface and communicate with such other vehicle sensors, actuators, and systems 80.

The vehicle 10 also has a display 30, which may be a single general purpose display, multiple general purpose displays (such as the dashboard display 16 and heads up display 20 of FIG. 1), and/or multiple special purpose displays (such as speedometers, fuel gauges and the like), or any appropriate combination thereof. The vehicle also has an input device 40, which may include push buttons, sensor wheels, touch sensors that operate in conjunction with displays to provide touch screen functionality, motion sensors, and the like. Generally the display 30 is used in conjunction with the input device 40 to allow driver control of vehicle functions and convenience features, such as climate control, GPS navigation, telephone functionality, audio systems, entertainment and infotainment systems, as well as provide safety messages and warnings.

The vehicle has an active language setting, which may be set to be one of a plurality of available languages. The available languages are those languages for which the vehicle can generate all standard messages, and generally has commonly used words cross referenced with other languages such that it is capable of translating between any of such available languages. The active language setting is the language used for all messages, warnings, commands and prompts, as well as used to receive and interpret instructions from the driver. The active language may be set to be any one of the plurality of available languages in which such messages, warnings, prompts, instructions, and other communications may be generated by the vehicle 10. The active language may be set by the driver manually using the input device 40, or may be determined and set in accordance with the principles of the present disclosure as described hereinbelow.

The vehicle has a short range communication transceiver 42, capable of communicating with portable electronic devices of the driver, such as the smartphone 120. Such communication may take place via a communication protocol, such as BLUETOOTH, or through other methods of short range communication.

Figure 3:
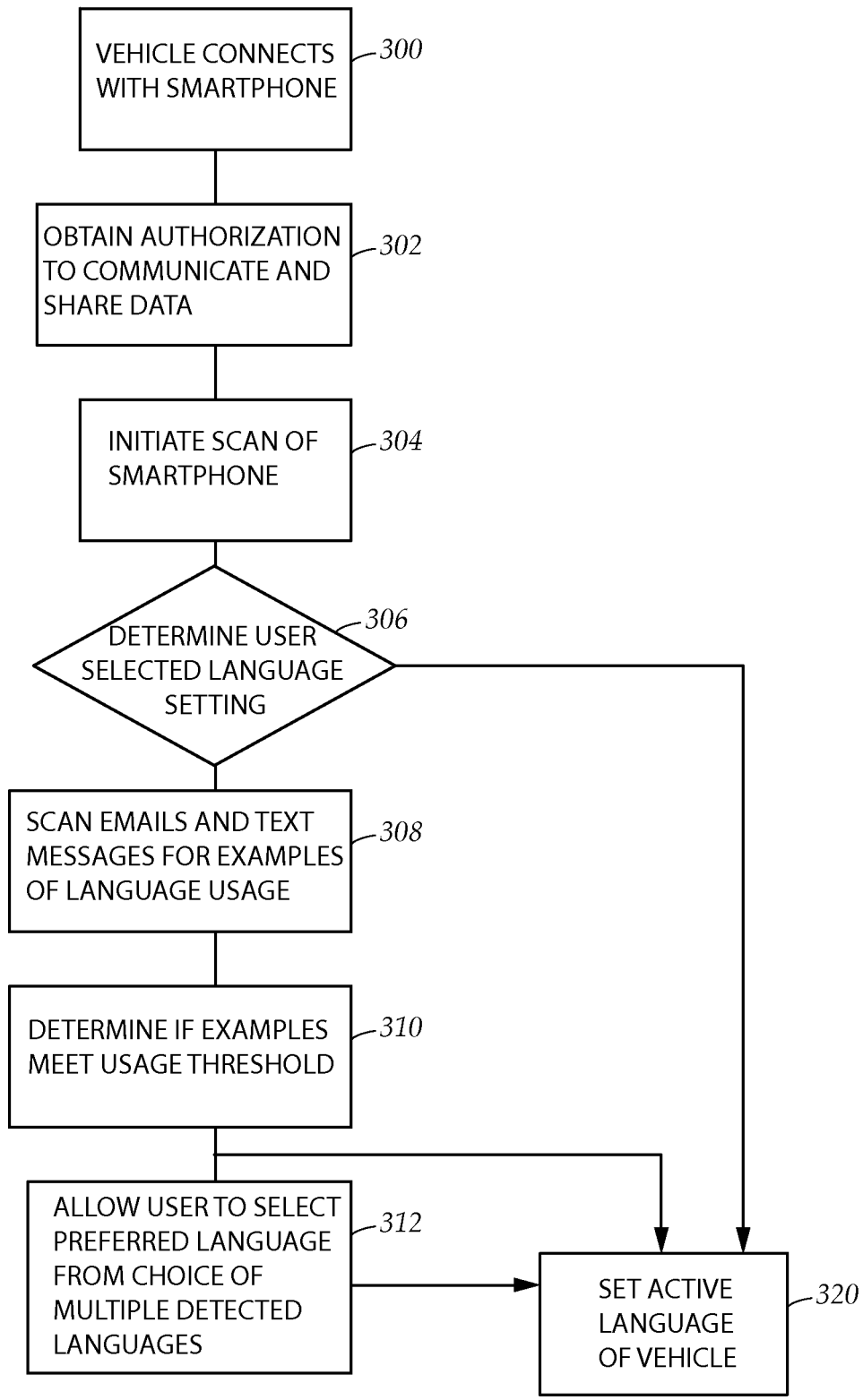
FIG. 3 is a flow diagram, illustrating steps for setting an active language of the vehicle, in accordance with an embodiment of the present disclosure.

Initially, using the example where the portable electronic device 120 is a smartphone, and using the short range communication transceiver 42, the smartphone connects with the vehicle 300, as indicated in FIG. 3. Then, through appropriate handshaking protocols, authorization to communicate and share data is established 302 between the smartphone and vehicle. Such authorization may include "pairing", such as commonly performed between BLUETOOTH devices, and/or any other necessary steps on the part of the devices and driver to provide permission for the vehicle to scan the smartphone for the purposes of the present disclosure.

Once sufficient permission is obtained, the vehicle initiates a scan of the smartphone 304. The smartphone is scanned to determine its user selected language setting 306. Once determined, the user selected language setting of the smartphone may be used to set the active language of the vehicle 320.

If the user selected language setting is not found, the smartphone may be scanned to find examples of language usage in emails and text messages 308. Once examples of language usage are differentiated in emails and text messages, the vehicle may determine whether the detected examples of language usage meet a threshold usage 310. Such determination may be made for each language detected. For example, if Spanish is detected in outgoing text messages, but only in a few occurrences, such limited usage might not exceed the threshold usage as it might not be a fair indicator that the driver prefers Spanish. Accordingly, the threshold may be set empirically at a level which fairly reflects the communication habits of a speaker of the detected language. The threshold might be measured as a percentage of communications, and might involve weighing certain types of communications—such as outgoing messages over incoming messages—as being more probative for making a reasonable assessment of which language the driver is comfortable communicating. Once these predetermined requirements are met, the detected language is employed to set the active language of the vehicle 320.

When multiple languages are detected that appear to meet the threshold requirement, an algorithm might be used to favor one language for setting the active language of the vehicle. For example, the user selected language setting of the smartphone might be favored over the presence of a frequently used language in text and email communications. Such algorithm may be determined through empirical testing to isolate the most likely predictors for correctly assessing the preferred language of the driver.

When multiple languages are detected, the vehicle may offer the user a choice of languages 312. Once a languages is selected by the driver from among the detected languages, such selection is used to set the active language of the vehicle 320.

Once the active language has been set, the vehicle communicates with the driver using the active language. Referring again to FIG. 2, the CPU is in communication with the sound module 17, which includes an audio interface 19A, a microphone 19B, and a speaker 19C. In a typical vehicle environment, the microphone 19B and speaker 19C might actually include several microphones and speakers. In addition, the vehicle may include a visual scanner 25 capable of capturing images and receiving visual data from the environment near the vehicle. For example, the visual scanner 25 can be used to capture image data from road signs, and provide image to text translation therefrom. An external communication module 27 allows data to be communicated from the control unit 20 to other vehicles and infrastructure.

Figure 4:
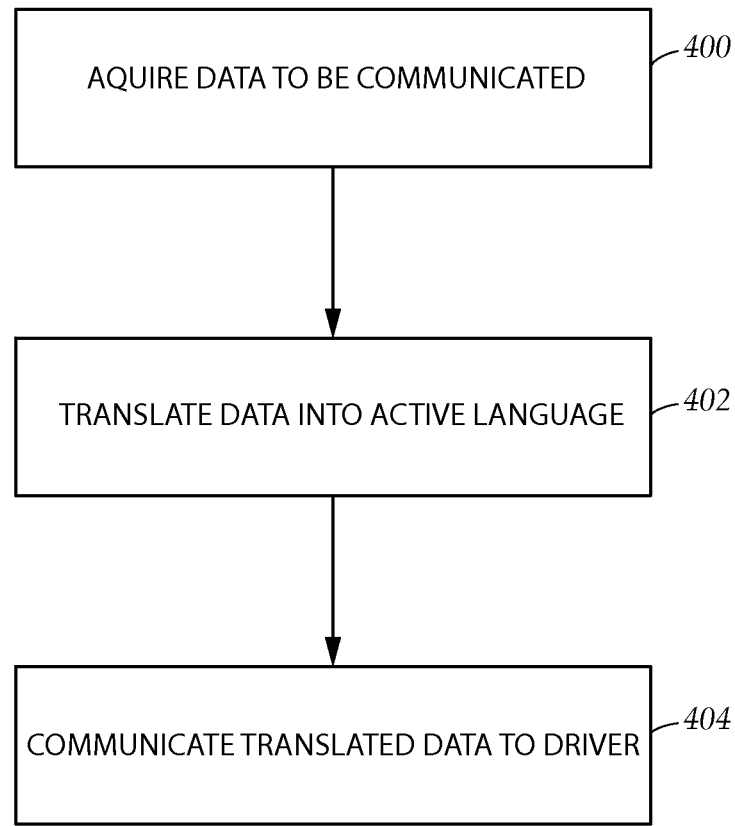
FIG. 4 is a flow diagram, illustrating acquisition and translation of data to the active language, according to f an example embodiment of the present disclosure.

Referring to FIG. 4, any data intended to be communicated to the driver 400 is translated to the active language 402. The translated data is then communicated to the driver in the active language 404. Communicating to the driver in the active language 404 may take place audibly or visually, using the sound module 17, display 16, heads up display 20, and the like.

Figure 5:
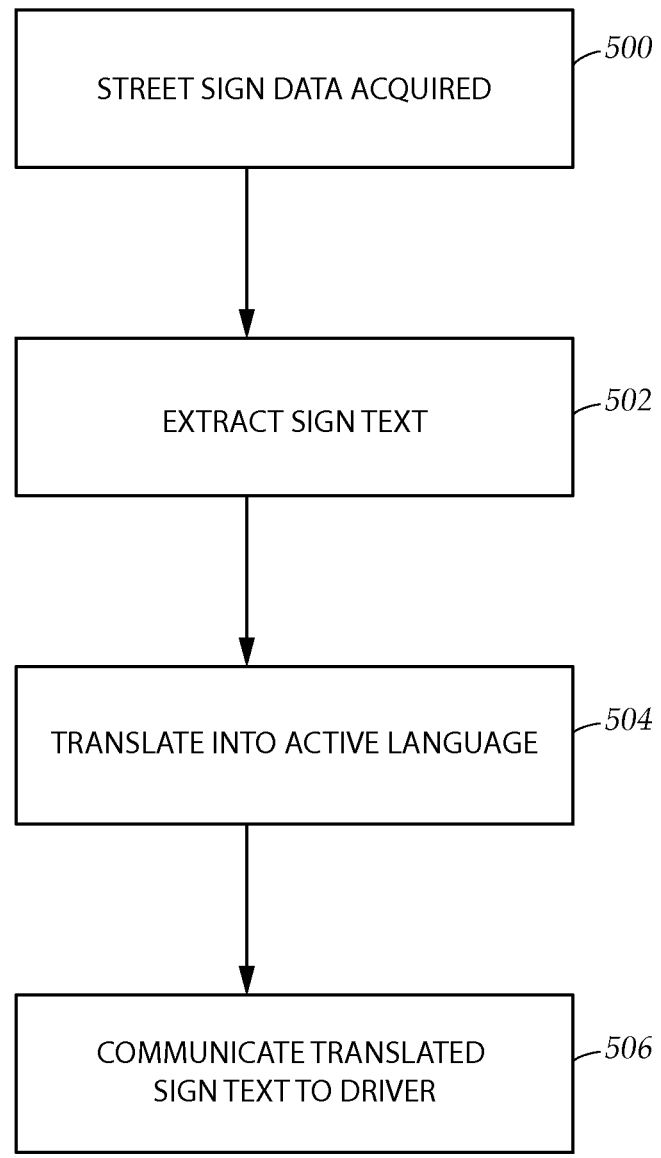
FIG. 5 is a flow diagram, illustrating translation of sign data into the active language, in accordance with an embodiment of the present disclosure.
Figure 6:
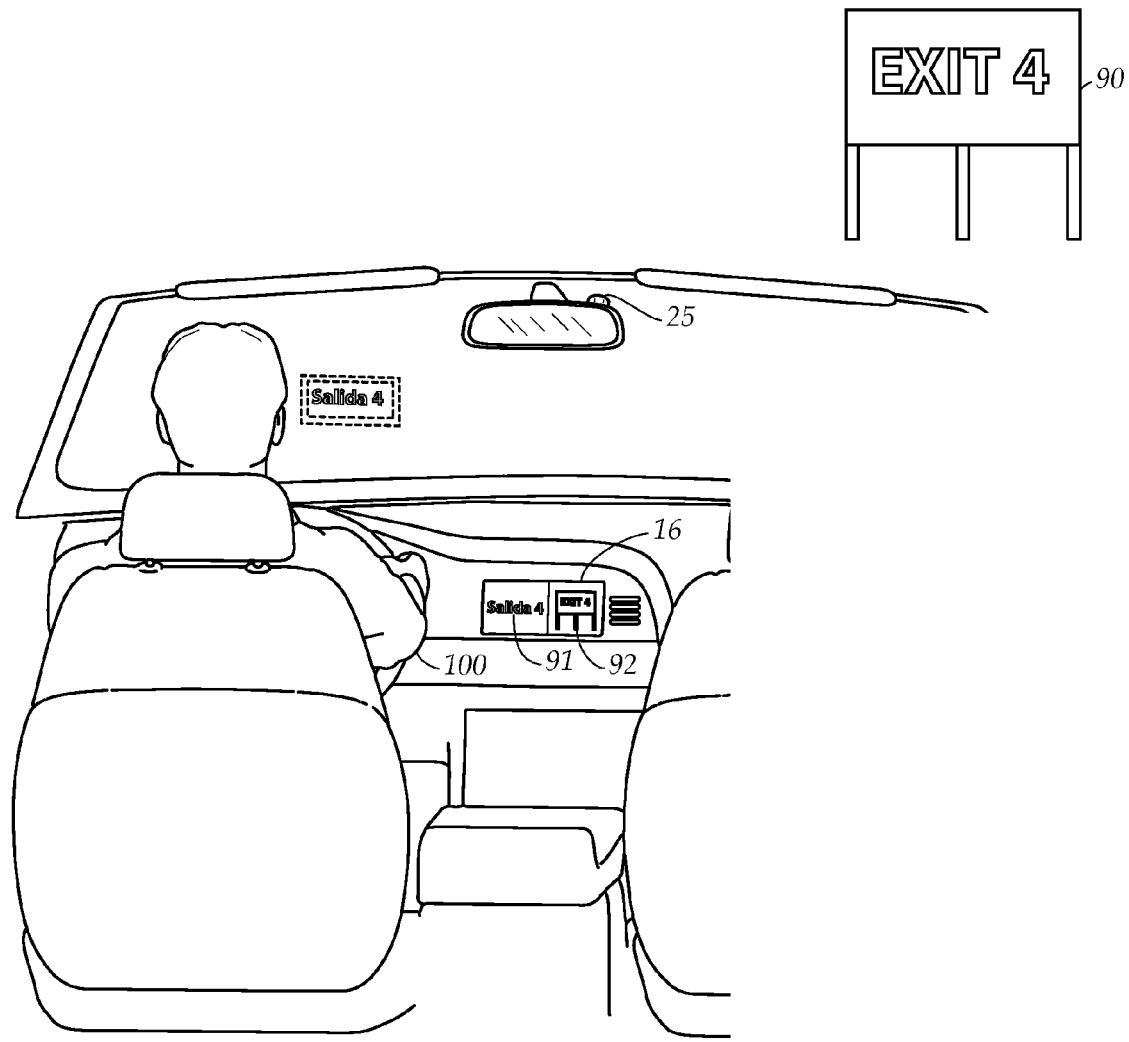
FIG. 6 is a diagrammatic perspective view, illustrating real time sign data translation, in accordance with an embodiment of the present disclosure.

Referring simultaneously to FIGS. 5 and 6, as the vehicle 10 approaches a street sign 90, street sign data is acquired 500, generally by the visual scanner 25, which may include a camera and any other imaging equipment and software for acquiring and processing images of street signs and other external visual messages. The street sign data is processed to extract sign text 502. The sign text 502 is translated into the active language 504. The translated sign text 91 is then communicated to the driver 506. Communication may include display of the translated text 91 alone on the dashboard display 16 or heads up display 20 and/or reintegration of the translated sign text into a displayed image of the street sign 22. It should be noted that systems exist and are presently being refined by others for translating text in visual images and reintegrating them into the image. Accordingly, the manner of operation of such systems is within known by those skilled in the art and thus beyond the scope of the present discussion. Note that in addition to visually providing the translated sign text, said translated sign text may be read audibly to the driver 100 using the sound module.

FIG. 6 provides an example where the active language has been set to Spanish. Accordingly, following the detection of the street sign 90, bearing the message "Exit 4", appropriate translation has been made to "Salida 4", and such is displayed on the dashboard display 16 and heads up display 20.

In addition to sign data, external data from various sources, including vehicle to vehicle communications and vehicle to infrastructure communications, are translated into the active language, and communicated appropriately to the driver. The steps indicated in FIG. 4 provide a framework for translating any and all messages, prompts, communications, and the like, into the active language so that they may be understood by the driver, who may choose whether to take action thereupon. The use of the active language may continue until the vehicle is exited by the driver, until the vehicle is turned off, until the portable electronic device is no longer detected, until a new portable electronic device is detected after a period of absence by a previously paired electronic device, until the language setting system is reset, or until a new language setting is otherwise requested of the system.

It is understood that when an element is referred hereinabove as being "on", "attached", or "connected to" another element, it can be directly on, attached, or connected to the other element or intervening elements may be present therebetween.

In conclusion, herein is presented a vehicle language setting system. The disclosure is illustrated by example in the drawing figures, and throughout the written description. It should be understood that numerous variations are possible, while adhering to the inventive concept. Such variations are contemplated as being a part of the present disclosure.

What is claimed is:

1. A vehicle automatic language setting method, for use by a vehicle having an active language setting, to facilitate communication between a vehicle and a driver automatically, said driver having a preferred language and having a portable electronic device, comprising the steps of:
   connecting the vehicle to the portable electronic device for the purpose of at least language determination;
   determining the preferred language of the driver by scanning the portable electronic device for the purpose of at least one in-vehicle component language determination;
   associating in-vehicle components comprising of at least one climate control, at least one infotainment system, and at least the one vehicle safety sensors to said vehicle;
   setting the active language of the vehicle and/or at least one in-vehicle component to the preferred language automatically; and
   communicating data by the vehicle and/or at least one-in-vehicle component to the driver automatically in the preferred language, absent said data being communicated between the portable electronic device and the vehicle; and/or
   absent of the dependency of a navigation system, GPS or geographic location.

2. The vehicle language setting method as recited in claim 1, wherein the portable electronic device has a user selected language setting, and wherein the step of determining the preferred language of the driver further comprises determining the user selected language setting of the portable electronic device automatically; and the vehicle language setting method as recited in claim 1, wherein, a plurality of in-vehicle components have an equal chance of utilizing said vehicle language setting method and outputting the results from a single vehicle component controller and/or from a combination of vehicle component controllers automatically to said driver.

3. The vehicle language setting method as recited in claim 2, wherein the steps as recited are followed by the steps of:
   translating a vehicle message into the active language;
   displaying and/or outputting the translated vehicle message to the driver.

4. The vehicle language setting method as recited in claim 3, wherein the steps are recited are followed by the steps of:

acquiring sign image data of a street sign and/or acquiring sign data automatically from vehicle or in-vehicle component;

extracting data from the sign image data and/or extracting data from sign communication;

translating the data into the active language; and displaying and/or outputting the translated vehicle message to the driver.

5. The vehicle language setting method as recited in claim 1, wherein the portable electronic device is a smartphone.

6. The vehicle language setting method as recited in claim 5, wherein the portable electronic device has a user selected language setting, and wherein the step of determining the preferred language of the driver further comprises determining the user selected language setting of the portable electronic device.

7. The vehicle language setting method as recited in claim 5, wherein the step of determining the preferred language of the driver further comprises scanning text messages and emails for example of language usage, where said language examples meets a threshold usage on said portable electronic device which reflects the communication habits of the driver or the threshold usage on said portable electronic device uses an algorithm through empirical testing to isolate the most likely predictors for correctly assessing the preferred language of the driver; and/or determination of preferred language comprises of scanning incoming and/or outgoing communications of said driver for threshold language usage on said portable electronic device, and said language determination is to be used for the purpose of establishing a vehicle language and/or at least one in-vehicle component language setting.

8. A vehicle automatic language setting method, for use by a vehicle having an active language setting, to facilitate communication between a vehicle and a driver automatically, said driver having a preferred language and having a portable electronic device, comprising the steps of:

connecting the vehicle to the portable electronic device for the purpose of at least language determination;

determining the preferred language of the driver by scanning the portable electronic device for the purpose of at least one in-vehicle component language determination;

associating in-vehicle components comprising of at least one climate control, at least one infotainment system, and at least one vehicle safety sensors to said vehicle;

setting the active language of the vehicle and/or at least one in-vehicle component to the preferred language automatically; and communicating data by the vehicle and/or at least one-in-vehicle component to the driver automatically in the preferred language, absent said data being communicated between the portable electronic device and the vehicle; and/or absent of the dependency of a navigation system, GPS or geographic location.

9. The vehicle language setting method as recited in claim 8, wherein the smartphone has a user selected language setting, and wherein the step of determining the preferred language of the driver further comprises determining the user selected language setting of the smartphone.

10. The vehicle language setting method as recited in claim 9, wherein the step of determining the preferred language of the driver is preceded by the step of authorizing communicating between smartphone and vehicle.

11. The vehicle language setting method as recited in claim 10, wherein the steps as recited are followed by the steps of:

translating a vehicle message into the active language;

displaying and/or outputting the translated vehicle message to the driver.

12. The vehicle language setting method as recited in claim 10, where the said vehicle has an external communication module for allowing vehicle-to vehicle communication and vehicle to infrastructure communication, and further comprising the steps of:

acquiring a vehicle message from the communication module;

translating the vehicle message into the active language; and displaying and/or outputting the translated vehicle message to the driver.

13. The vehicle language setting method as recited in claim 8, wherein the step of determining the preferred language of the driver further comprises scanning text messages and emails for example of language usage, where said language examples meets a threshold usage on said portable electronic device which reflects the communication habits of the driver or the threshold usage on said portable electronic device uses an algorithm through empirical testing to isolate the most likely predictors for correctly assessing the preferred language of the driver; and/or determination of preferred language comprises of scanning incoming and/or outgoing communications of said driver for threshold language usage on said portable electronic device, and said language determination is to be used for the purpose of establishing a vehicle language and/or at least one in-vehicle component language setting.

14. The vehicle language setting method as recited in claim 13, wherein the step of determining the preferred language of the driver is preceded by the step of authorizing communicating between smartphone and vehicle.

* * * * *